Feb. 18, 1941. J. GREIG 2,232,383
PRESSURE FREEZER
Filed May 15, 1939
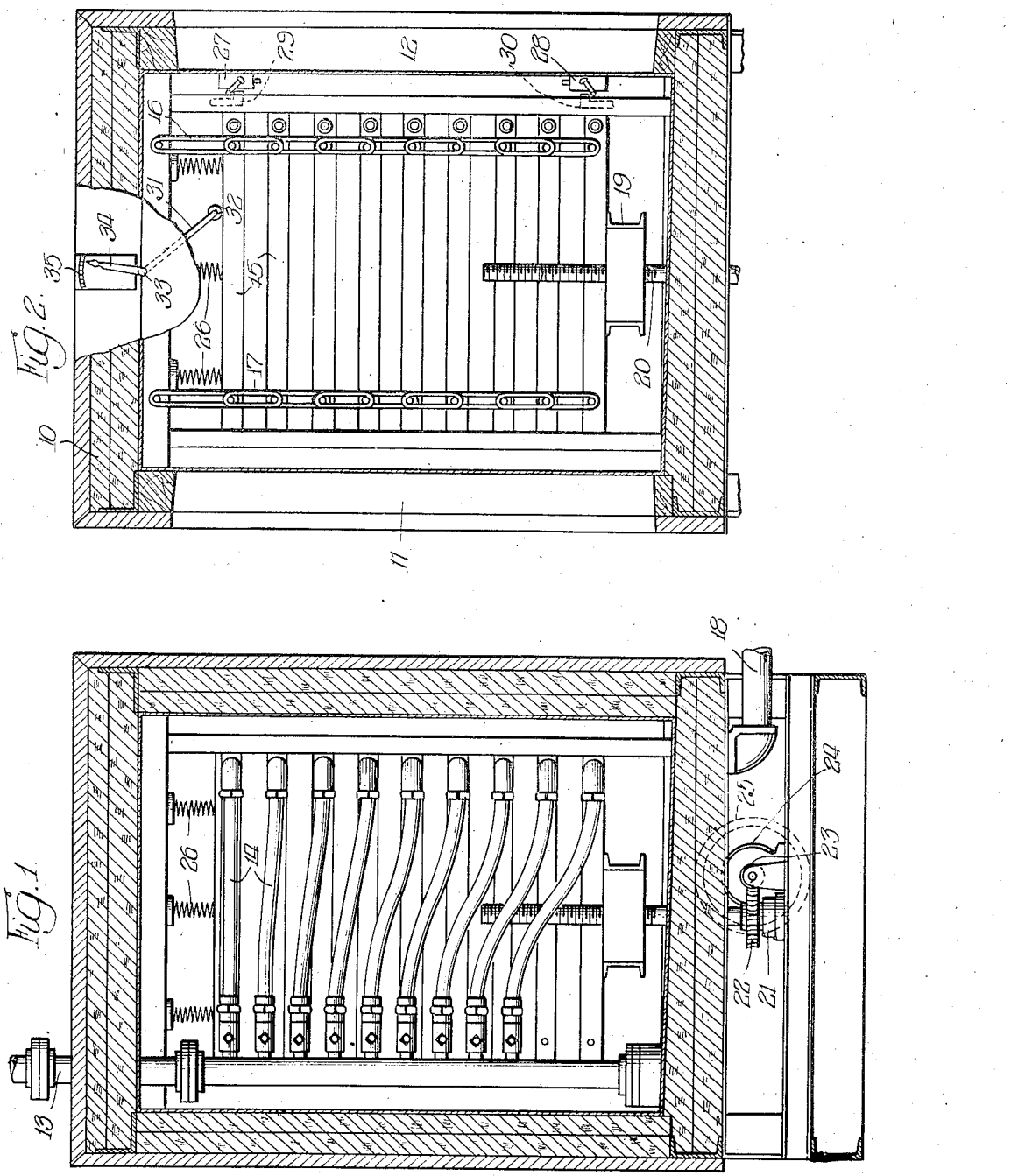
INVENTOR.
James Greig,
BY
ATTORNEY.

Patented Feb. 18, 1941

2,232,383

UNITED STATES PATENT OFFICE 2,232,383

PRESSURE FREEZER

James Greig, Dorchester, Mass., assignor to Booth Fisheries Corporation, Chicago, Ill., a corporation of Delaware Application May 15, 1939, Serial No. 273,632

5 Claims. (Cl. 62—114)

My invention relates to refrigeration, and particularly to a device adapted for use in connection with the freezing of food products under pressure.

In the practice of quick-freezing of certain food products, it has been found to be desirable to freeze under pressure in order to secure good contact of the product with the refrigerated surfaces. In the treatment of fish, which is relatively incompressible, a considerable pressure should be exerted, and the freezing of relatively large quantities is accomplished by the use of a plurality of vertically spaced hollow plates, the product to be frozen being placed between adjacent plates, and means being provided for moving the plates into position to compress the product between the plates.

In the operation of machines of this character certain difficulties are encountered in controlling the degree of pressure to be applied. In the freezing of fish the expansion due to freezing is 5% to 7% of the volume, depending on the character of the fish. Thus if too great a pressure is exerted at the beginning of the freezing operation the expansion of the product occurring thereafter is likely to develop so great a pressure that parts of the machine may be broken or the product may be squeezed out of the container and thus be unsightly.

The difficulty has been in determining just the degree of pressure that is being exerted during the freezing operation, and to that end I have devised apparatus that will not only absorb excessive pressure but will indicate the degree of pressure being exerted at any time. The apparatus accomplishes the stated result and in addition provides a means whereby the operator may know when the freezing operation is complete; that is, when the block or body of the product is frozen throughout.

The invention will be more readily understood by reference to the accompanying drawing, in which;

Fig. 1 is a sectional view through a refrigerating device constructed in accordance with my invention, the view being of one end with the insulating cabinet cut away; and, Fig. 2 is a view of the same end, the section being taken at a point inside of the hose connections shown in Fig. 1.

The device comprises an insulated cabinet indicated generally by the numeral 10, having door openings 11, 12 at its two sides. A brine inlet pipe is indicated at 13 providing a header to which hoses 14 are connected. At their opposite ends the hoses are connected to hollow plates 15 guided for vertical movement within the cabinet and suspended one above the other on loops or links 16, 17, which serve to suspend the series of plates from the upper wall of the cabinet in equally spaced relation. The opposite end of the device is provided with hose connections similar to those shown in Fig. 1 for connecting the pipes to the brine outlet pipe 18.

Extending underneath the lowermost of the series of hollow plates 15 is a structure 19 having a screw threaded opening at each end for engagement by a screw 20, the lower end of which rests on a thrust bearing 21 and carries a worm gear 22. This is engaged by a worm 23 operated by a reversible motor 24. In addition, I may provide a hand wheel 25 for manual operation if required, for reasons hereinafter discussed.

Acting against the uppermost of the plates 15 are a plurality of compression springs 26 having a known resistance at different degrees of compression. Limit switches 27, 28 are provided for automatically stopping the motor at the two limits of movement of the plates, these switches being operated by projections 29, 30 movable with the upper and lower plates respectively.

The indicator of my invention comprises an arm 31 having a roller 32 on its lower end adapted to contact the upper plates, the arm acting to rotate a shaft 33 that carries a pointer 34. The scale 35 is calibrated according to the resistance of the spring 26 to indicate pressure. The initial pressure to be exerted will be predetermined according to the area of the material confined between the respective plates and according to the resistance of the springs 26. This will determine the location of the upper limit-switch finger 29 and the operator will be able to determine visually that the correct pressure has been applied by examining the pointer 34. As the freezing progresses the expansion in the product will develop an increase in pressure which will be reflected by the indicator arm. This is due to the fact that the uppermost plate will rise against the force of the springs 26 and cause movement of the indicator arm. When a predetermined point has been reached as shown by the indicator, the operator will know that the product is completely frozen and the motor will be operated to lower the plates to separate them and to enable the removal of the product. As before stated, the calibration of the indicator will be such as to show when the product has expanded to the extent of the known expansion, due to complete freezing of the fish being frozen. However, regardless of the calibration, the device provides a convenient means for indicating possible excessive pressure that would result in damage to the machine.

If the operator determines at any time that the pressure being exerted, as shown by the indicator, is greater or less than that required, he may make a suitable adjustment through the manually operable means for the worm.

While I have found that the apparatus is more practical when constructed as shown, yet all the advantages in the use of my novel indicating mechanisim would accrue if the plate operation was reversed; that is, where pressure was exerted from the top rather than from the bottom. In any event, however, I have found that the use of a predetermined spring resistance to the movement of the extreme plate and the measuring of such movement constitutes an accurate means of determining the extent of pressure being exerted on the product to be frozen.

I claim:

1. In a freezing device, the combination of a plurality of superposed plates and means for exerting force to lift said plates in succession to compress a product to be frozen between the plates, spring means acting against the uppermost plate to resist the compressing force, and a device for indicating the extent of compression of the spring means by said uppermost plate, said device being calibrated to visually correlate the fact of complete freezing with the known ratio of expansion of the product.

2. In a quick freezing device, the combination of a plurality of hollow plates suspended one above the other and on each other, means for exerting force against the lowermost plate to lift successive plates and to compress a product between said plates, and spring means acting against the uppermost of said plates adapted to absorb the force of expansion during freezing.

3. In a quick freezing device, the combination of a plurality of hollow plates suspended one above the other and on each other, means for exerting force against the lowermost plate to lift successive plates and to compress a product between said plates, spring means acting against the uppermost of said plates, and an indicating arm movable by said uppermost plate for indicating the extent of movement of said plate.

4. In a quick freezing device, the combination of a plurality of hollow plates suspended one above the other, means for exerting force against the lowermost plate to lift successive plates and to compress a product between said plates, spring means acting against the uppermost of said plates, and an indicating arm movable by said uppermost plate for indicating the extent of movement of said plate, said indicating arm being calibrated to indicate the fact of complete freezing.

5. In combination, a plurality of superposed plates and unyielding means for moving said plates in succession to compress between the plates a product that expands on freezing, spring means applied to an extreme plate for resisting the pressure of said moving means and the pressure exerted by the expansion of the product between all of the plates during freezing, whereby the movement of said extreme plate represents the cumulative movement of all of the plates, means for indicating said cumulative movement and for correlating said movement with the known ratio of expansion of the product during freezing.

JAMES GREIG.